(12) United States Patent
Zaborovsky et al.

(10) Patent No.: US 7,281,129 B2
(45) Date of Patent: Oct. 9, 2007

(54) SECURE COMPUTER NETWORK WITH A NETWORK SCREEN

(76) Inventors: Vladimir S. Zaborovsky, 2-Murinsky 37-52, Saint-Petersburg, 194021 (RU); Sergey V. Kupreenko, Shaumyana av. 87-56, Saint-Petersburg, 195213 (RU); Yuri A. Shemanin, Tikhoretsky 5/4 -36, Saint-Petersburg, 194064 (RU)

( * ) Notice: Subject to any disclaimer, the term of this patent is extended or adjusted under 35 U.S.C. 154(b) by 791 days.

(21) Appl. No.: 10/036,897

(22) Filed: Dec. 26, 2001

(65) Prior Publication Data

US 2002/0087889 A1 Jul. 4, 2002

(30) Foreign Application Priority Data

Dec. 29, 2000 (RU) ............................. 2000133391

(51) Int. Cl.
*H04L 9/00* (2006.01)
*G06F 15/16* (2006.01)
*G06F 9/00* (2006.01)
*G06F 11/30* (2006.01)
*H04L 29/06* (2006.01)

(52) U.S. Cl. .................. 713/162; 726/11; 726/13; 713/153; 709/246; 709/249

(58) Field of Classification Search ............... 713/162, 713/160, 163, 150, 154, 153, 168, 161; 370/389; 709/224, 225, 250, 246, 249; 726/11, 13, 726/23, 12
See application file for complete search history.

(56) References Cited

U.S. PATENT DOCUMENTS 5,623,601 A * 4/1997 Vu ............................. 726/12
5,878,231 A * 3/1999 Baehr et al. ................ 709/245
5,898,830 A    4/1999 Wesinger, Jr. et al.
5,983,270 A * 11/1999 Abraham et al. ........... 709/224
6,950,946 B1 * 9/2005 Droz et al. .................... 726/35

FOREIGN PATENT DOCUMENTS

EP         713311 A1 *  5/1996

OTHER PUBLICATIONS

Golnaz Vakili, Gholam H. Riahy, Amir H. Rezaie, "Combination of a Transparent Firewall and a DoS Attack Detection System", Apr. 2006, Information and Communication Technologies, 2006, ICTTA '06 vol. 2, pp. 3528-3533.*

* cited by examiner

Primary Examiner—Matthew Smithers
Assistant Examiner—Courtney D Fields
(74) Attorney, Agent, or Firm—Jason H. Foster; Kremblas, Foster, Phillips & Pollick

(57) ABSTRACT

This invention takes advantage of the capability to keep secured physical and logical addresses of the internal subscribers of the local network using a special network screen for the packets exchanged between the network segments and using a special program to control the packets communication processes between the network interfaces. The program of control resolves the task of information delivery using special codes in the packet headers that are different from their logical and physical addresses. The network screen has a special interface to change, control and tune filter parameters.

8 Claims, 3 Drawing Sheets

SECURE COMPUTER NETWORK WITH A NETWORK SCREEN

(e) BACKGROUND OF THE INVENTION

1. Field of the Invention

The invention relates to a computer firewall.

2. Description of the Related Art

The majority of local computer networks (LCN) today have access to the Internet. However existing network protocols do not have special internal security features to secure private networks and keep data integrity. Therefore the enlargement of different features and increasing requirements to the network security demand usage of special devices to block selectively information resources and control data exchange between different computer networks.

Network screens are widely used as such devices called firewalls. A network screen is a special network device that is located between two different segments of an LCN in such a way that packets exchanged between these two segments is limited by special filter rules for incoming and outgoing data streams. Such a device may be installed between secured segment of an LCN and a router with one of its ports connected to the Internet. In that case filter rules of the packet traffic may block inbound and outbound activities of a secured LCN including given users, time of day, days of week and months.

An example of existing firewalls is U.S. Pat. No. 5,898,830, which is incorporated herein by reference, that represents a network screen located between two computer networks with transparent network activity for the users of the secured network. For this purpose the network screen supports a configuration of two sets of virtual subscribers. The first set may be addressed only from secured segment and the second one may be addressed only from the opened segment of the network. These two sets are software compatible by the table adequacy of their network addresses as it is done for DNS servers. Provisioning and restriction for the data packets from a virtual subscriber with one set of addresses to the virtual subscriber with another set of addresses is done in accordance with the rules of packets filtration that are kept in the configuration file of the network screen.

Virtual subscribers, except one that is especially devoted to this purpose, do not have access to the system files and other system resources of the device used as a network screen. A control program module provides configuration of the network screen and, more particularly, creation of virtual users in accordance with the configuration files written when the device was started. Access to these configuration files can be provided using the rules of authorization function by a special virtual user addressed from the computer network. These rules include check of identity and authorization of the user that made a request. When this access is provided, the configuration file of the network screen that controls data exchange between computer networks may be modified. Transparency of this screen to the network level protocols does not mean that this network screen cannot be discovered using special software tools. Since a set of secured network units is screened by one network interface on the channel level of the network activity, each of these units is identified by the physical address of this network interface.

The procedure of identification of the network subscriber used to get access to the configuration file is not secured against intruders. That means the possibility of unauthorized access exists by trying different passwords or using hidden software holes.

Another known device used for similar purposes is Sun-Screen Secure Net 3.1, which is a product of Sun Microsystems. This device contains a firewall that has a so-called 'stealth mode' when no logical (IP) addresses are used for external data exchange. The SunScreen Secure Net has a network address translation function that enables a screen to map an internal network address to a different external address, masking the identity of machines within the enterprise. When packets pass between an internal host and a public network, their IP addresses are replaced with new addresses transparently, checksums and sequence numbers are corrected and the state of the address map is monitored. Administrators can specify when a packet using ordered network address translations is applied based on source or destination addresses. This device still uses physical (MAC) addresses of subscribers, for example for ARP requests for VPN tunnel functions. This means that from the inside the secured network stealth interface is completely visible.

(f) BRIEF SUMMARY OF THE INVENTION

The invention is a secure computer network with a network screen that relates generally to security engineering in a telecommunication network, and particularly to the hardware and software components of the network screens (firewalls) used to block unauthorized access and data exchange between different components of the computer network.

The invention takes advantage of the capability of using the principle of the warranted security based on complete secretion of network interface addresses of a secured device. This task is resolved by using a network screen that has network interfaces for the data exchange between the network units but it does not have a network address. This network screen does not use network addresses for its functionality and it does not send physical addresses of the network interfaces to the external network. Therefore, this network screen cannot be located by any tools of secured or opened segments of the network.

According to the present invention, a special network screen is used to control filter processes of the packets traffic. This screen is completely isolated from the network interfaces that make it possible to avoid any possibility of unsanctioned access to this network screen for the users of secured and opened segments of LCN. The problem of warranted security is resolved also by the inability of users of opened or secured segments of the network to create any special channel the packet data exchange between network interfaces and direct interface by means of internal system bus used for the special network screen. This special network screen keeps information about the addresses of senders and/or receivers using the rules of packet filtration, and makes it possible to hide the existence of the network screen from users. In other words, the filter program excludes the network screen from the list of receivers of informational packets that are coming to the network interfaces while the network screen sends the packets only to external receivers.

(g) BRIEF DESCRIPTION OF THE SEVERAL VIEWS OF THE DRAWINGS

This and other advantages of the invention will be apparent those of ordinary skill in the art by reference to the following detailed description and the accompanying drawings.

Figure 1:
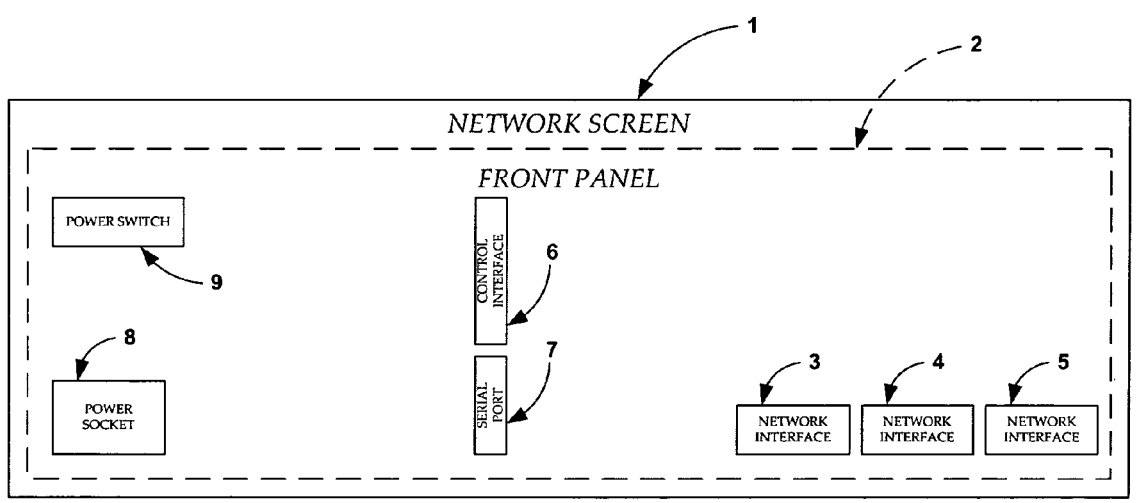
FIG. 1 is a general view of the network screen from the front panel side where control units and interfaces of external connections are located.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

In FIG. 1 the network screen 1 used for the local computer network (LCN) is a special computer device with internal operational system. Such a computer device may be based on a personal computers motherboard (Gigabyte, GA-5AX) that may have up to 5 external devices connected with an internal PCI bus. Such a computer device may use different types of processors including Pentium MMX, Cyrix MII, AMD K-6, RISC MIPS and others. The network screen 1 contains network interfaces for packet data exchange such as Ethernet adapters of different types with 100 Mbit/sec for ISA OR 100/10 Mbit/sec for PCI bus; for example Fast Etherlink XL 3Com.

The front panel 2 of the network screen contains connectors for three data exchange interfaces, shown in FIG. 1 as reference numerals 3, 4 and 5. Each of the network adapters is connected to a local computer network segment build on the universal bus architecture with Ethernet protocol. The network screen may use up to five segments of the LCN. If the LCN uses a different protocol its network adapters should support this protocol, too. The front panel 2 also contains connectors for contacts for the interfaces 6 and 7 of COM ports using standard RS232C. One of these connectors is used as an operational interface that modifies the program of control of the data exchange between segments of the LCN connected through network screen 1. The LCN segments may be connected to interfaces 3 or 4, or interfaces 3, 4 and 5 depending on their quantity. There is also a connector 8 and a source switch 9 on the panel 2. On this embodiment of the invention network screen 1 uses the operating system UNIX that provides multitask functionality for the program of control in accordance with a configuration file that is located in source undependable memory device of the network screen 1.

Figure 2:
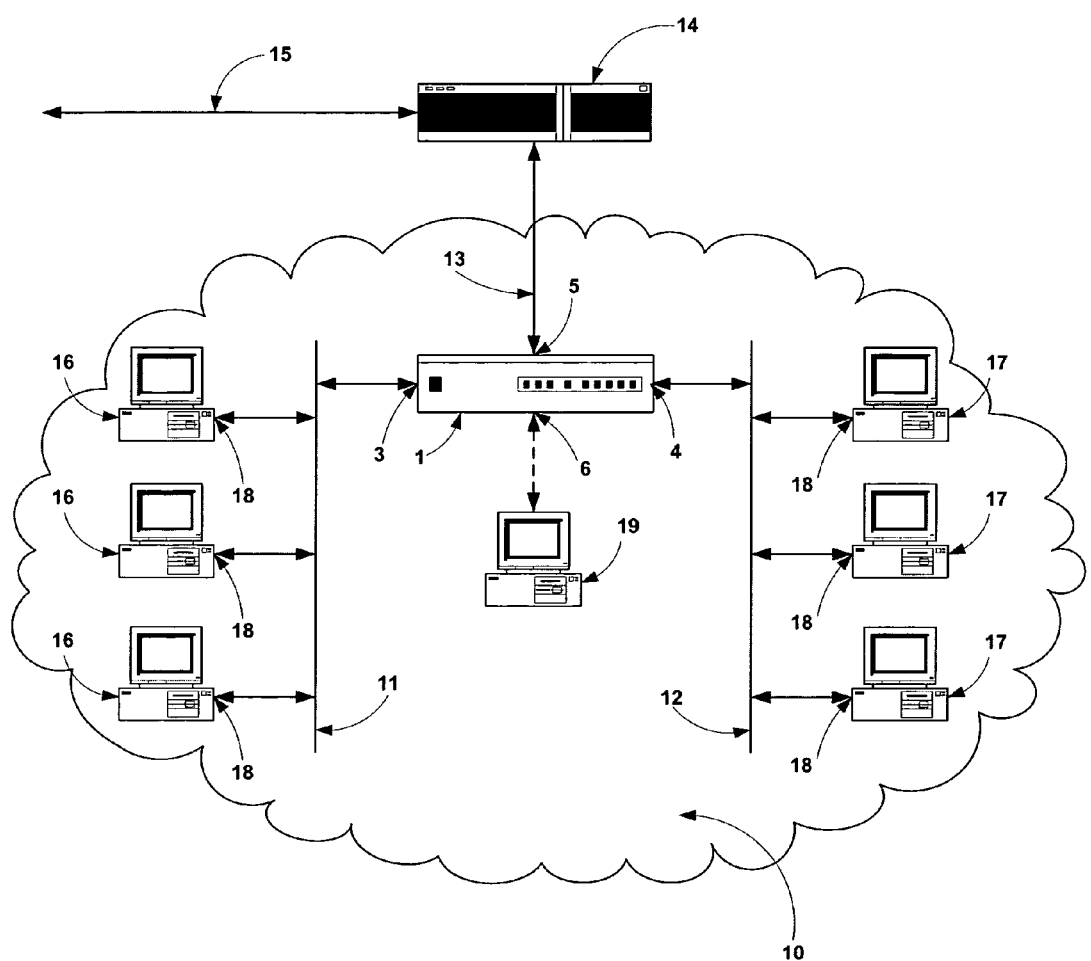
FIG. 2 is a schematic illustration of the connection between two local computing networks connected also with external network via network screen.

In FIG. 2 is shown an example of a connection between the LCN and the network screen 1. Network screen 1 there splits a secured corporate LCN 10 with bus architecture into segments 11, 12 and 13, which are connected, respectively, to the network adapters 3, 4 and 5. Such a structure of LCN 10 may be used in the corporate computer network where different network segments are used for different types of data applications. These applications may have different requirements for the level of confidentiality of delivered data that is taken into consideration for each of the network interfaces.

In this example segment 13 contains only one subscriber, gate 14, that provides connection of the LCN 10 with an external network 15. The network 15 may be connected with the other network also. The gate 14 can use modem lines to connect the LCN with the Internet using dial-up channels. Each of the segments 11 and 12 of the LCN contains several subscribers 16 and 17 that are connected to these network segments by the Ethernet adapter 18. To make changes in the program of control network packets delivery between interfaces 3, 4 and 5 including filter rules, a special computer 19 is connected to control interface 6. These modifications of the control program may be done from the computer 19 using a standard program of a Web navigator (browser), for example Netscape Navigator, using a connection between computer 19 and network screen 1 authorized with password by protocol PPP.

The program of control provides network packets delivery between the network interfaces that are addressed to the users of opened or secured segments. Since the network screen does not have addresses associated with its network interfaces, this screen cannot be used as a receiver of any network packets, it can be used only as a passive transit unit between network interfaces or as a breaker that rejects packets that did not pass filter rules between these interfaces. The program of control network packets delivery for interfaces 3, 4 and 5 (driver of the network adapters Ethernet) keeps unchanged address filed of sender in their information blocks that are delivered to the network screen 1 through interfaces 3, 4 and 5.

The gate 14 works as a router that exchanges information about conditions of the network connections with another device of the same kind and sends packet traffic to the other segments of the corporate network and to the Internet. Therefore, the LCN 10 is completely secured by the network screen with network interfaces that do not have physical (MAC) and logical (IP) addresses. Such a screen is untouchable for remote attacks through computer networks because it is not a receiver of the information packets. The network screen cannot be detected by standard tools of network identification because its interfaces used for connections with network segments are operated in such a way that they do not answer for ARP requests about their physical (MAC) addresses.

Figure 3:
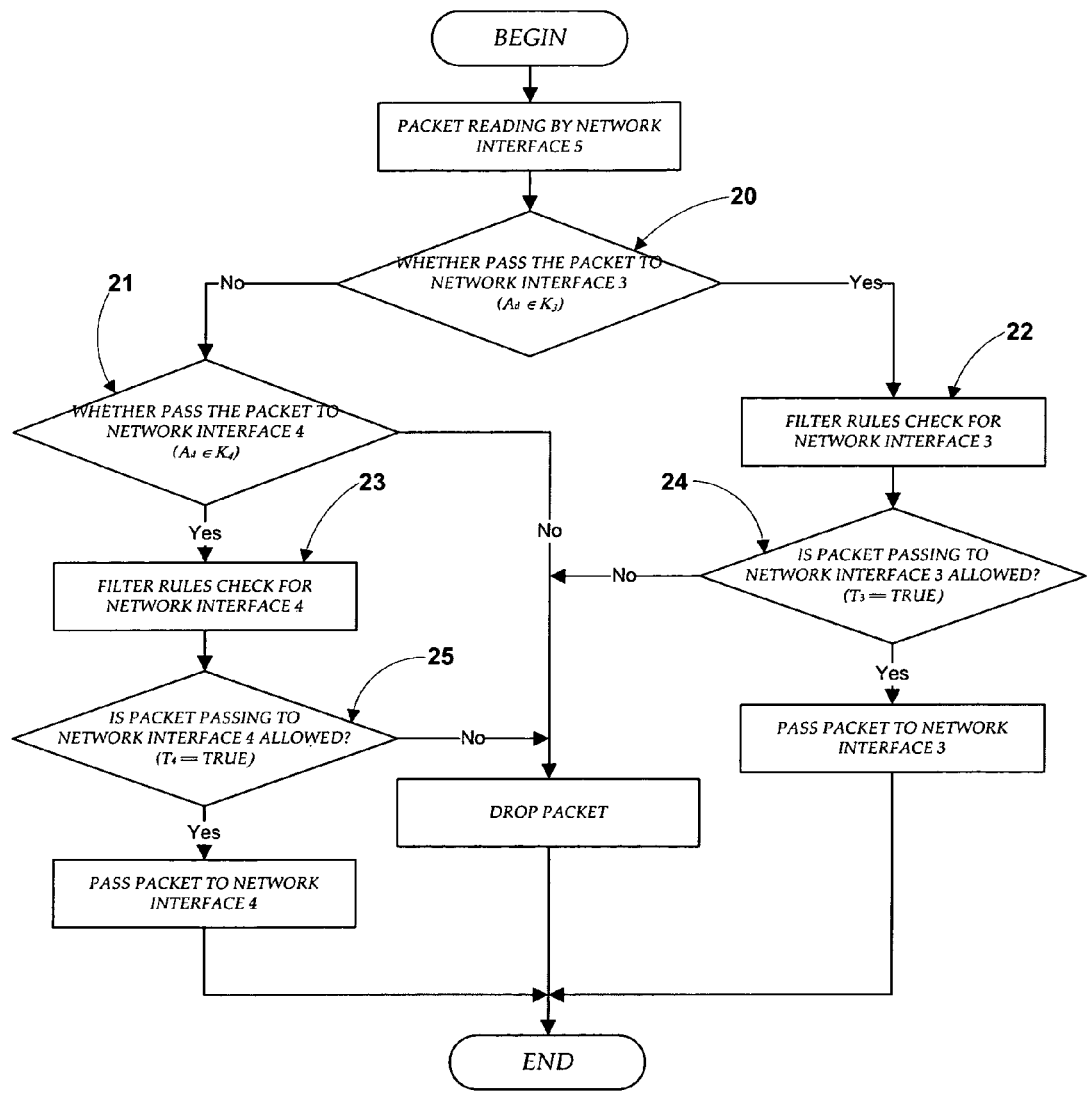
FIG. 3 is an adapted algorithm for the program of control information that blocks transmissions that are coming to one of the interfaces of the network screen.

FIG. 3 shows an algorithm of filter packets coming to the network interface 5. Each packet coming through the segment 11 of LCN 10 receives by interface 5 that keep it in its buffer memory. Primary processing of it according to the filter rules consists of a sequential execution of the operations 20 and 21 that is a sequential test of receivers physical address Ad in the header of the processing packet.

While certain preferred embodiments of the present invention have been disclosed in detail, it is to be understood that various modifications may be adopted without departing from the spirit of the invention or scope of the following claims.

The invention claimed is:

1. A device combined with a computer network for packets delivery with headers that contain logical and physical addresses of at least one of the sender and the receiver of information, the device comprising: a network screen connected to the computer network and through which the packets pass, wherein the network screen splits the computer network into at least two segments, has hardware and software means, and at least two network interfaces by which the network screen connects to the computer network for packets exchange between the network segments, wherein the software controls the process of packets commutation between the network interfaces based on a set of filtration rules, does not name logical addresses to the segments, does not send physical addresses to the computer network and at the same time the software permits transit delivery through the network interfaces only to those packets with headers that meet said filtration rules.

2. The device in accordance with claim 1 wherein the network screen is based on a universal computer device having an operating system, more than two network interfaces and a special direct interface for editing said filtration rules.

3. The device in accordance with claim 1 wherein said filtration rules of the network screen disallow a transit delivery of any messages that do not have special mark and address parameters in their headers.

4. The device in accordance with claim 1 wherein access to the program of editing said filtration rules is protected by password.

5. The device in accordance with claim 1 wherein the network screen after processing the packet with said filtration rules keeps unchanged the logical and physical addresses of the sender in the packet's header and the network screen does not name network interfaces with logical addresses and does not send their physical addresses to the network segments connected with them and the network screen contains a special direct interface connected thereto to edit the filtration rules and any changes of filtration rules are processed only through this interface and the program of control provides packet delivery from one network interface to another only when the information in the packet's header satisfies all filter requirements.

6. The device in accordance with claim 5 wherein the network screen is a special computer device with an internal operating system universal bus for data exchange with the interfaces and a separate channel of control protected by password.

7. The device in accordance with claim 1, further comprising a special direct interface to define said filtration rules.

8. The device in accordance with claim 7 wherein packets outbound from said device through one of said network interfaces retain in their headers a physical address of the at least one sender of the packets by the program that controls the network screen not communicating the physical addresses of its network interfaces.

* * * * *